United States Patent [19]

Harvey

[11] Patent Number: 5,204,707
[45] Date of Patent: Apr. 20, 1993

[54] MULTIPLE MODE PRINTS FROM TELE/PAN CAMERA

[75] Inventor: Donald M. Harvey, Webster, N.Y.

[73] Assignee: Eastman Kodak Company, Rochester, N.Y.

[21] Appl. No.: 590,241

[22] Filed: Sep. 28, 1990

[51] Int. Cl.$^5$ .......................... G03B 3/00; G03B 27/46
[52] U.S. Cl. ........................................ 354/75; 354/106; 354/195.1; 355/41; 355/56
[58] Field of Search ................. 354/75, 76, 105, 106, 354/195.1; 355/40, 41, 55, 56

[56] References Cited

U.S. PATENT DOCUMENTS

| | | | |
|---|---|---|---|
| 4,583,831 | 4/1986 | Harvey | 354/106 |
| 4,639,111 | 1/1987 | Harvey | 354/481 |
| 4,652,104 | 3/1987 | Harvey | 354/106 |
| 4,812,871 | 3/1989 | Taniguchi et al. | 354/421 |

Primary Examiner—Michael L. Gellner
Attorney, Agent, or Firm—Roger A. Fields

[57] ABSTRACT

Multiple mode "tele," "pan" and "normal" prints are produced automatically using a tele/pan camera. With the camera set to a single frame - multiple mode option, a single exposed frame is encoded with a composite fiducial representing all of the chosen modes. During subsequent printing, in response to sensing the composite code, a printer produces multiple prints from the single frame, each print corresponding to a different one of the modes. With the camera set to a multiple frame - multiple mode option, a single depression of a shutter release button initiates a rapid sequence of exposures of multiple frames, each exposure being coded to correspond with a different single one of the multiple modes. Subsequent printing then proceeds on a one frame - one print basis to produce prints in each mode.

17 Claims, 3 Drawing Sheets

MULTIPLE MODE PRINTS FROM TELE/PAN CAMERA

TECHNICAL FIELD

The present invention relates generally to the production of pseudo telephoto, pseudo panoramic and normal mode prints using a tele/pan camera; and, more particularly, to methods and apparatus for selectively producing multiple photographic mode prints using such a camera.

BACKGROUND ART

Conventional cameras enable the production during subsequent print processing of prints having views corresponding to the whole fields of view seen through the lens and recorded on the whole film frame at the time of exposure. Telephoto and panoramic prints are produced during normal processing under standard enlargements in accordance with the fields of view seen through telephoto and panoramic lenses used to take the pictures. A tele/pan camera, on the other hand, enables simulated or pseudo telephoto and panoramic prints to be produced from film frame exposures made without the use of corresponding telephoto and panoramic lenses. This is accomplished by coding the film at the time of exposure to identify variations from normal processing to be made subsequently during printing in order to achieve the desired effect. A tele/pan camera can also be used to make normal prints.

An example of a pseudo telephoto mode print is one that is made from a central portion of an exposure having the same width-to-length ratio (e.g., 3 1/2:5) as that of the whole exposure recorded by the camera. During the printing process, the frame negative image is masked at upper, lower, left and right marginal zones, leaving the central portion unobscured to be printed with increased magnification for obtaining an enlargement of normal print size. The enlargement has the same width-to-length ratio as that of the non-masked central portion. Thus, in response to coding the film with a pseudo telephoto mode indicating fiducial at the time the exposure is made, the central portion of the exposure is magnified at the time of printing beyond the usual magnification which would be used to make a normal print for the camera lens employed to take the picture, and the resulting print will have a telephoto or close-up format appearance.

An example of a pseudo panoramic mode print is one that is made from a narrow portion of an exposure having a greater width-to-length ratio (e.g., 1:3) than that of the whole exposure recorded by the camera. During the printing process, the negative frame image is masked at upper and/or lower marginal zones, leaving the narrow portion unobscured. An enlargement is then made of the narrow, non-masked portion to provide a print having the same width-to-length ratio as that of the narrow portion. Thus, in response to coding the film with a pseudo panoramic mode indicating fiducial at the time the exposure is made, the field of view is adjusted at the time of printing to provide a print which has a panoramic or elongate format appearance.

A normal mode print is one that is made from the whole exposure recorded by the camera and has the same width-to-length ratio (e.g. 3 1/2:5) as the whole exposure. The negative frame image is usually left unmasked during the printing process.

U.S. Pat. No. 3,490,844 discloses a method of making a print of a selected portion of a subject to be photographed. The method comprises the steps of viewing the subject in the viewfinder of a camera; manually adjusting a mechanical masking member visible in the viewfinder to frame a selected portion of the subject; exposing the film in the camera to obtain a latent image of the subject; encoding the exposure on the film with indicia representative of the selected portion of the subject; processing the film to obtain a negative of the latent image of the subject; and sensing the indicia to make a print of the selected portion of the subject from the negative.

When the selected portion of the subject has the same relative position in the viewfinder as a corresponding portion of the exposure, enlargement of the portion in the negative will provide a pseudo telephoto effect similar to the actual telephoto effect provided by a telephoto lens. Thus, a pseudo telephoto print can be made during the printing process from an exposure taken without a telephoto lens.

U.S. Pat. No. 4,357,102 discloses a method of making a pseudo panoramic mode print from an exposure. According to that method, a window in the viewfinder of a camera has its upper and/or lower marginal zones masked off by an appropriate insert to provide a viewing area with a width-to-length ratio greater than 1:2, and preferably 1:3. Exposures are taken with the viewfinder window partially masked and, during the printing of the negative, the negative image is correspondingly masked to provide a non-masked portion having the same width-to-length ratio as that of the unobscured portion of the viewfinder window. Printing paper with a similar width-to-length ratio is used. Prints can thus be obtained which have a panoramic or elongate format without using a panoramic lens.

U.S. patent application Ser. No. 07/486,463, filed Feb. 28, 1990 discloses a tele/pan camera including an exposure control system for automatically increasing the shutter speed used for exposure of a selected pseudo telephoto or pseudo panoramic field of view, as compared to the shutter speed automatically selected for exposure at the same lighting of an actual field of view of a camera objective lens, and for automatically compensating for such shutter speed increase by boosting other exposure parameters, such as by increasing aperture size or activating a flash unit.

In known tele/pan cameras, a film frame is coded at the time of exposure with a selected single one of the available pseudo telephoto, pseudo panoramic and normal print mode options. No provision is made for selectively automatically producing multiple mode prints of the same subject.

DISCLOSURE OF THE INVENTION

It is an object of the invention to provide means for selectively automatically producing multiple prints of the same subject in selected different pseudo telephoto, pseudo panoramic or normal mode formats from film frame exposures made using a tele/pan camera.

In accordance with one embodiment of the invention, a single film frame exposed by depression of a shutter release switch is encoded with indicia representative of the selected multiple print processing format modes, and the indicia are subsequently sensed to make multiple prints during later processing, each of a different pseudo telephoto, pseudo panoramic or normal mode format, based on different portions of the latent image negative sequentially masked in response to sensing of the indicia.

In accordance with a second embodiment of the invention, in response to selected multiple print processing format modes, multiple frame exposures are made in response to a single depression of the shutter release switch, each frame encoded with indicia representative of a different one of the selected multiple modes. Subsequent print processing then proceeds in usual manner, with one print being produced for each frame.

BRIEF DESCRIPTION OF THE DRAWINGS

Embodiments of the invention have been chosen for purposes of description and illustration, and are shown in the accompanying drawings, wherein.

Throughout the drawings, like elements are referred to by like numerals.

MODES OF CARRYING OUT THE INVENTION

A tele/pan photographic camera system of the type to which the present invention relates enables pseudo telephoto, pseudo panoramic and normal mode prints to be produced from exposed film frames by coding the film frames at the time of exposure to identify the processing parameters to be used during subsequent printing in order to achieve the selected modes. Known versions of such systems are described in U.S. Pat. Nos. 4,583,831; 4,639,111 and 4,652,104 to the same inventor, the disclosures of which are incorporated herein by reference thereto.

Figure 1:
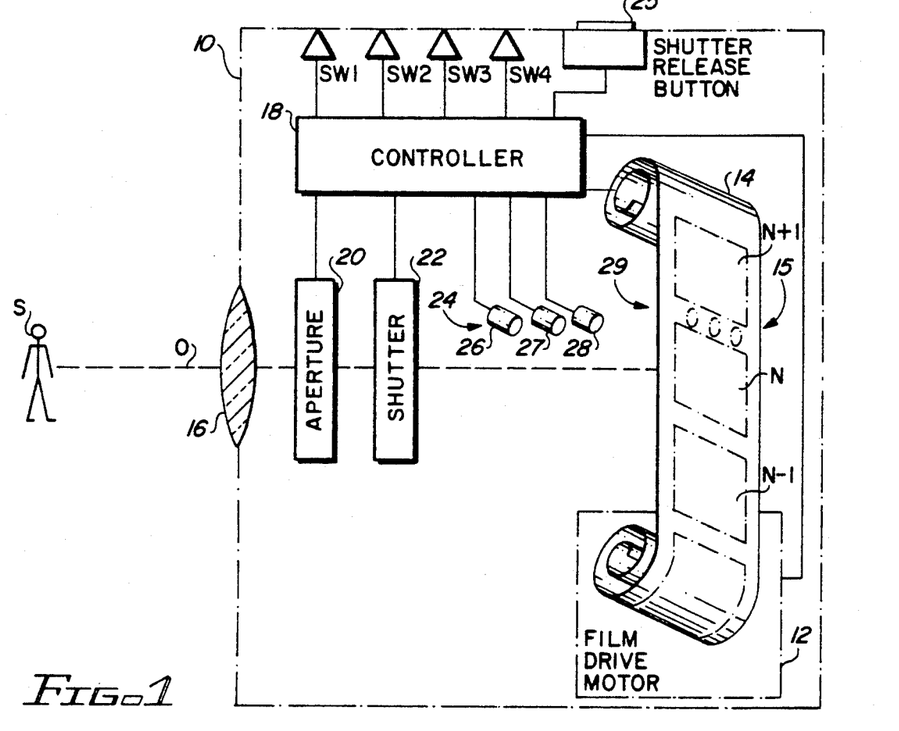
FIGS. 1 and 2 are block diagrams respectively showing the general features of a tele/pan camera and a photographic printing system usable for implementing the present invention.

As shown in FIG. 1, a tele/pan camera 10 includes a film transport mechanism 12 for supporting and advancing a filmstrip 14 past an exposure station 15 within the body of camera 10. A lens 16, aperture mechanism 20 and shutter mechanism 22 are positioned along an optical axis O to control the exposure of picture frames N−1, N, N+1 to provide undeveloped latent image scenes onto filmstrip 14. The lens 16 serves, for example, as shown to focus an image of a subject S onto a frame section N located at a portion of the film 14 supported in the focal plane of the lens 16 at the exposure station 15. The lens 16 may be a fixed lens, or may be a variable focal length zoom lens. Provision, such as by means of manually operable switches SW1, SW2, SW3, is made for selecting among a plurality of pseudo telephoto ("tele"), pseudo panoramic ("pan") and normal ("normal") mode settings in accordance with the view desired for the print to be produced from the exposed frame during subsequent processing. A "normal" mode selection (which may be made, e.g., by closing switch SW1) corresponds to a field of view in the end product print that coincides with the actual field of view observed by the lens 16. A "tele" or "pan" mode setting (which may be made, e.g., by closing switch SW2 or SW3) corresponds to a desired print field of view that is different from that actually observed by the lens 16.

A controller 18, for example a microprocessor, is connected to the aperture and shutter mechanisms 20, 22 and to film transport mechanism 12. Controller 18 is also connected to a shutter release button 25 operation of which causes the controller 18 to set aperture 20 and actuate shutter 22.

The camera 10 further includes a recording device 24 connected to the controller 18 and which is positioned adjacent film 14 so as to record data on the film. The recording device 24 may, for example, comprise three light emitting diodes (LEDs) 26, 27, 28 which are disposed in evenly-spaced relationship within the camera 10 for selective energization to spot-expose various code fiducials in binary form onto the film 14 at a location 29 adjacent an exposed frame N, as indicated schematically in FIG. 1. Selective energization of the LEDs 26, 27, 28 is controlled by controller 18 in response to the open or closed status of the respective switches SW1, SW2, SW3 as set by the user prior to depressing the release button 25 to initiate a frame exposure. The switches may be manually individually set or (for example, as described in Applicant's copending U.S. application Ser. No. 07/486,463) may be configured to be set automatically in accordance with other settings of the camera (viz. settings of pseudo focal length indications on a zoom ring, settings of masking or pseudo field of view indicating elements on a viewfinder, etc.) The binary form of the resulting code fiducial exposed adjacent the film frame N identifies the particular setting entered at the switches SW1-SW3.

In accordance with the invention, provision is made for the simultaneous setting of more than one switch SW1-SW3 corresponding to a simultaneous selection of more than one of the pseudo telephoto, pseudo panoramic and normal modes for subsequent print processing to produce a plurality of prints, each print having a field of view corresponding to a different one of the multiple mode settings. The camera 10 includes a switch SW4 connected to controller 18 and user-settable for selecting between single frame - multiple mode printing and multiple frame - multiple mode printing options.

Code fiducials which may be exposed adjacent film frames in accordance with one coding arrangement are shown in the following table:

| Switches Closed | Models Selected | LED 26 | LED27 | LED28 |
| --- | --- | --- | --- | --- |
| None | Normal | 0 | 0 | 0 |
| SW1 | Tele | 1 | 0 | 0 |
| SW2 | Pan | 0 | 1 | 0 |
| SW3 | Normal | 0 | 0 | 1 |
| SW1, SW2 | Tele, Pan | 1 | 1 | 0 |
| SW1, SW3 | Tele, Normal | 1 | 0 | 1 |
| SW2, SW3 | Pan, Normal | 0 | 1 | 1 |
| SW1, SW2, SW3 | Tele, Pan, Normal | 1 | 1 | 1 |

Figure 2:
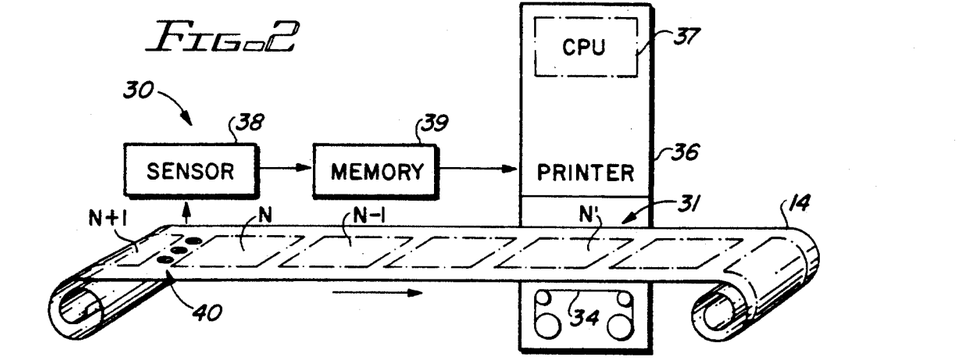

Referring now to FIG. 2, a photographic print system 30 is shown for printing, after development, the latent images recorded at frames N−1, N, N+1 of the filmstrip 14 by the camera 10 onto a roll 34 of light sensitive photographic paper. Printing system 30 includes a conventional photographic printer 36, including a computer (CPU) 37 for calculating and controlling print processing parameters. The CPU 37 determines the parameters in accordance with preprogrammed printing algorithms according to the mode established for a frame N' located at a printing station 31. Mode determination can be made by means of a sensor 38 positioned upstream of printer 36, relative to the motion of developed strip 14, for sensing the coded mode format selection data recorded on the strip 14 by the recording device 24 at the time of frame exposure. Because sensor 38 is positioned upstream of the printer 36, appropriate data memory circuitry 39 is provided for synchronizing the data measured by the sensor 38 for a frame N with the printing of that frame later when it reaches the position of frame N' in printer 36. Alternatively, sensor 38 can be positioned directly within printer 36 for sensing the data related to the frame N' being printed.

Figure 3A:
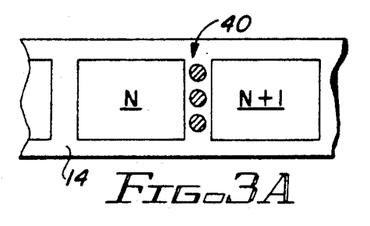
FIGS. 3A and 3B are fragmentary schematic views of a filmstrip showing alternative embodiments for coding selected multiple mode fiducials proximate exposed frames of a film and using the camera of FIG. 1.

Implementation of a single frame - multiple mode embodiment of the invention is described with reference to FIGS. 3A, 4A and 4B. Switch SW4 is set to the single frame option position. A selection of multiple pseudo telephoto, pseudo panoramic and normal modes is made according to which ones of the switches SW1-SW3 are closed. For example, as given in the table above, closing all three switches SW1-SW3 provides a simultaneous selection of "tele," "pan" and "normal" modes.

After depression of the shutter release button 25 (FIG. 1), an exposure of frame N located at station 15 will be made in accordance with exposure values (viz. size of aperture 20 and/or speed of shutter 22) set by controller 18 or previously manually set. In this way, subject S will be captured onto frame N of film 14 in a latent image having a field of view corresponding to the actual field of view of the lens 16. With switch SW4 set as indicated, the LEDs 26, 27, 28 of recording device 24 are activated by controller 18 in accordance with the switches SW1-SW3 to record the appropriate fiducial. For the "tele," "pan" and "normal" multiple mode setting, the composite fiducial 40 of "111" will be exposed marginally of frame N, as shown in FIG. 3A.

After the exposed film 14 has been developed in the usual way, film 14 is processed for printing in the printing system 30 (FIG. 2). Sensor 38 senses the fiducial 40 applied by the recording device 24 (FIG. 1) at the time of exposure. This data is transmitted through memory 39 to CPU 37 and, when the negative frame N reaches the printer (location of frame N' in FIG. 2), it is printed using parameters applicable for the particular multiple mode setting indicated by the coding of fiducial 40. In departure from known one frame - one mode systems, the CPU 37 is programmed to identify the composite nature of fiducial 40 and, in response thereto, automatically provide a plurality of prints of the same frame N, each print based on printing parameters (viz. masking, enlargement magnification, etc.) set according to a different one of the modes indicated by the composite. The mode order of priority is preset. The CPU 37 may, for instance, be programmed to determine the presence or absence of a mode by reading the fiducial from the LED 26 to the LED 28 exposure positions. In this way, for the "111" fiducial example, the frame N will first be printed for the "100" or "tele" mode. The paper 34 will then be advanced (or changed), without advance of the filmstrip 14, and the frame N will be printed again in the "010" or "pan" mode. Then, lastly, the paper 34 will again be advanced (or changed), without advancing the strip 14, and the same frame will be printed in the "001" or "normal" mode. In this manner, multiple prints are automatically produced, one print for each mode, in accordance with the multiple mode selection made at switches SW1-SW3 of the camera 10 at the time of exposure.

A limitation of the single frame - multiple mode option is that the recorded latent image of the subject S is the same for each print. As described in copending U.S. Ser. No. 07/486,463, however, it may be desirable to vary the normal camera settings for aperture 20 and/or shutter 22 at the time of exposure for different ones of the "tele," "pan" or normal print modes. This cannot be done when the different mode prints are all produced from the same single frame exposure.

Figure 3B:
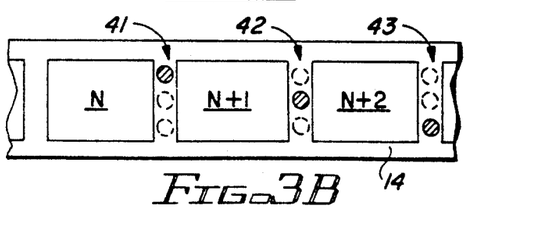
Figure 4A:
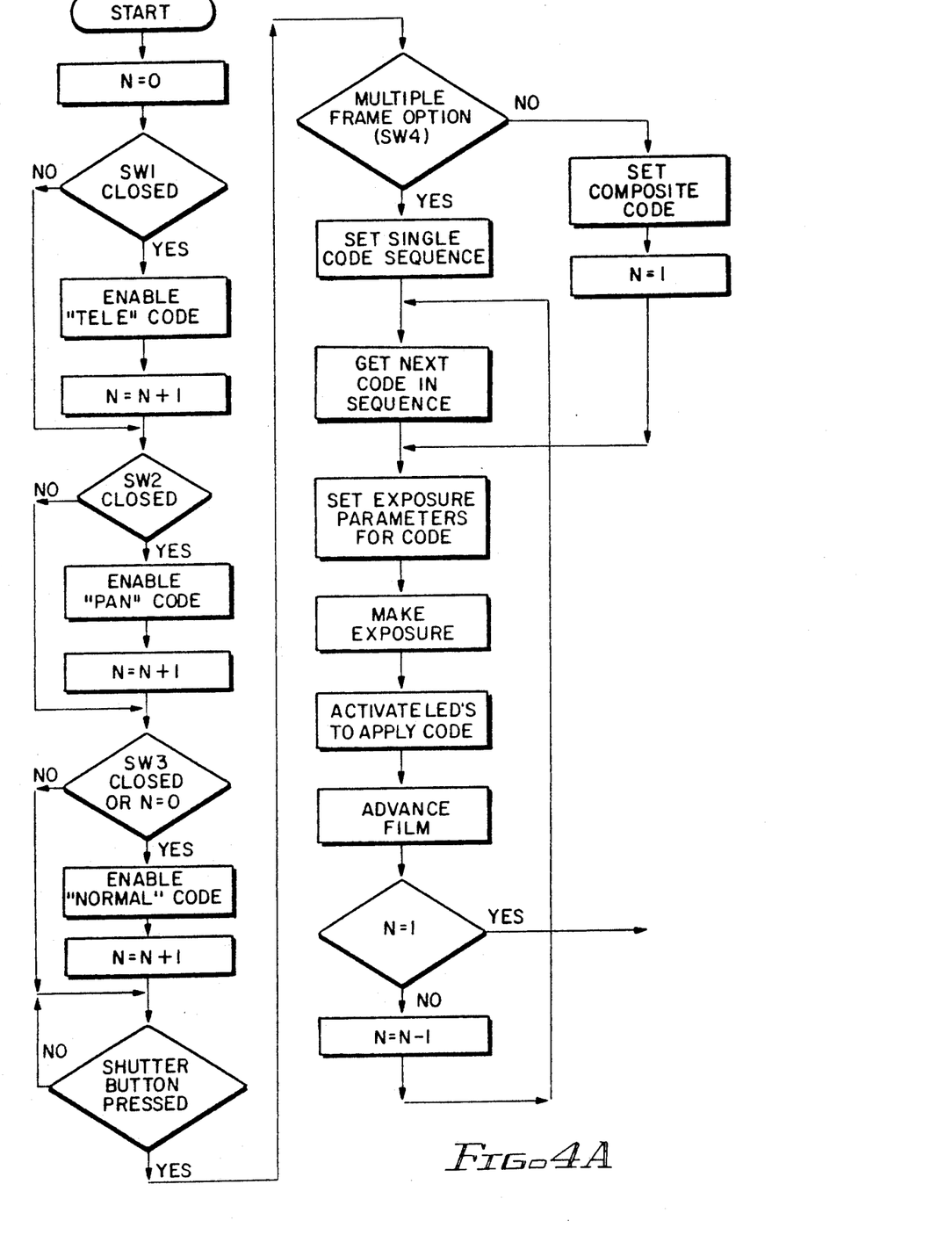
FIGS. 4A and 4B are flow diagrams of the programs usable with the camera and printing system of FIGS. 1 and 2.
Figure 4B:
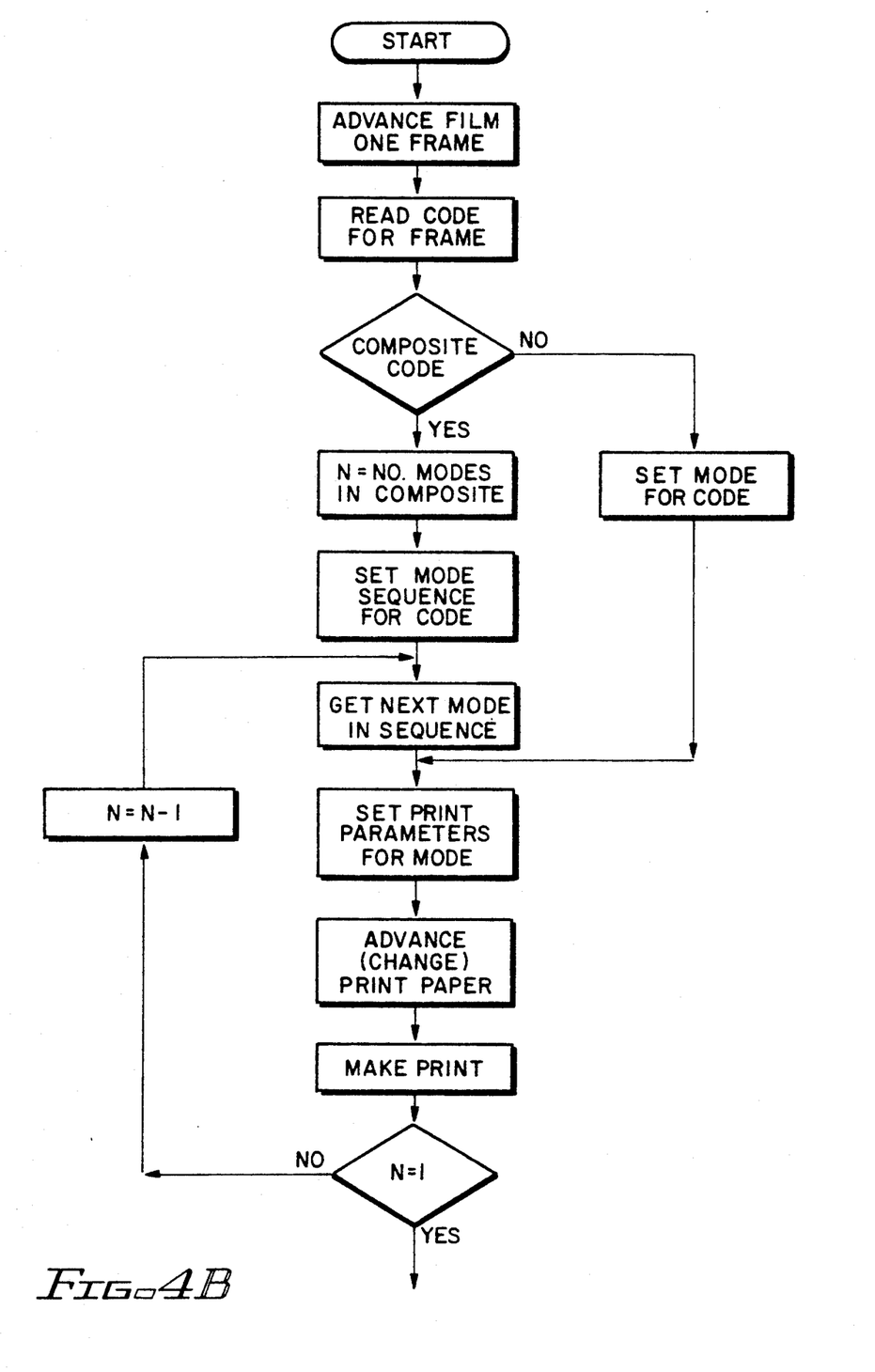

Accordingly, with reference to FIGS. 3B, 4A and 4B, the operation of the camera 10 may be varied to accomplish a rapid exposure of successive frames N, N+1, etc. for a single shutter release activation, each frame corresponding to one of the selected multiple modes.

For implementation of such multiple frame - multiple mode option, switch SW4 is set to activate a rapid sequence of multiple frame exposures of the same subject S. As shown in the flow diagram FIG. 4A, in response to setting of multiple modes on the switches SW1-SW3, the controller 18 will set up a rapid sequence of exposures of frames N, N+1, etc. in response to a single activation of the exposure mechanism, each exposure being made in accordance with parameters preset for a different one of the multiple modes. After each exposure, a single mode code fiducial is applied by recording device 24 adjacent the respective frame corresponding to that mode.

As shown in FIGS. 3B and 4A, when switch SW4 is in the multiple frame - multiple mode option position, the actuation of shutter release button 25 will expose a first frame N according to a first one of the selected SW1-SW3 settings. The recording device 24 will then record the code fiducial 41 corresponding to that first setting adjacent frame N. After recording the fiducial 41, controller 18 will then automatically advance the filmstrip 14 by means of film transport mechanism 12 to expose a next frame N+1 using parameters preset for the next one of the chosen multiple modes, with fiducial 42 being recorded corresponding to that mode, and so on. The priority ordering of the individual modes is preestablished. For the "tele," "pan" and "normal" multiple mode selection example, frame N may first be exposed using "tele" parameters, with the "100" code recorded adjacent that frame. The same subject S is then photographed in rapid succession without further depression of the shutter button 25 by exposing frame N+1 using "pan" parameters and frame N+2 using "normal" parameters, with the film being coded adjacent those frames with the codes "010" and "001," respectively.

With exposure of a multiple frame sequence as described, the print system 30 will operate in conventional fashion, with the sensor 38 picking up a single mode for each frame N, N+1, etc., and both the developed filmstrip 42 and print paper 44 being advanced after each printing step.

Although only three switches SW1-SW3 and three LEDs 26, 27, 28 are illustrated, it will be appreciated that the number of switches and LEDs may be varied to accommodate the inclusion also of other further pseudo format settings, each pseudo format setting corresponding to a different portion of the exposed frame N that will be masked.

Those skilled in the art to which the invention relates will also appreciate that other substitutions and modifications can be made to the described embodiment without departing from the spirit and scope of the invention as described by the claims below.

I claim:

1. A photographic camera having a shutter release mechanism; an objective leans with an actual field of view; means, responsive to activation of said shutter release mechanism, for exposing a film frame through said lens which frame, if fully printed during subsequent processing, will provide a normal print having a field of view corresponding to said actual field of view; means for selecting between a normal print setting and a pseudo format print setting; and means, responsive to said selecting means, for coding said film when said pseudo format print setting is selected to identify a portion less than all of said frame which, when said portion is printed during said subsequent processing, will provide a pseudo format print having a field of view different from said actual field of view; said camera being characterized in that:

said selecting means includes means for simultaneously selecting both said normal and pseudo format print settings;

said exposing means includes means, responsive to said simultaneously selecting means, for exposing first and second frames in rapid succession with a single activation of said shutter release mechanism when both of said print settings are selected; and said coding means includes means, responsive to said simultaneously selecting means, for coding said film when both of said print settings are selected to identify said portion less than all of said frame for said first frame and all of said second frame, to provide said pseudo format print rom said first frame and said normal print from said second frame during said subsequent processing.

2. A camera as in claim 1, wherein said selecting means comprises means for selecting among a normal print setting, a first pseudo format print setting and a second pseudo format print setting; said coding means comprises means, responsive to said selecting means, for coding said film when said first pseudo format print setting is selected to identify a first portion less than all of said frame which, when said first portion is printed during said subsequent processing, will provide a first pseudo format print having a first field of view different from said actual field of view; and said coding means further comprises means, responsive to said selecting means, for coding said film when said second pseudo format print setting is selected to identify a second portion less than all of said frame which, when said second portion is printed during said subsequent processing, will provide a second pseudo format print having a second field of view different from said actual field of view; and wherein said camera is further characterized in that:

said simultaneously selecting means comprises means for simultaneously selecting a plurality of said normal, first pseudo format and second pseudo format print settings;

said exposing means comprises means, responsive to said simultaneously selecting means, for exposing a plurality of frames in rapid succession with a single activation of said shutter release mechanism when said plurality of said print settings are selected; and said coding means comprises means, responsive to said simultaneously selecting means, for coding said film when said plurality of print settings is selected to identify corresponding all, first or second portions of said frames to provide a plurality of different respectively corresponding normal, first pseudo format or second pseudo format prints during said subsequent processing.

3. A camera as in claim 2, wherein said first pseudo format is a pseudo telephoto format, and said second pseudo format is a pseudo panoramic format.

4. A camera as is claim 1 further having means, responsive to said selecting means, for determining film exposure parameters for proper exposure of said frame; and wherein said camera is further characterized in that:

said exposing means includes means, responsive to said exposure parameter determining means and to said simultaneously selecting means, for exposing said first frame in accordance with exposure parameters selected for proper exposure of said fist frame to provide said pseudo format print, and for exposing said second frame in accordance with different exposure parameters selected for proper exposure of said second frame to provide said normal print.

5. A photographic camera having a shutter release mechanism; an objective lens with an actual field of view; means, responsive to activation of said shutter release mechanism, for exposing a film frame through said lens which frame, if fully printed during subsequent processing, will provide a normal print having a field of view corresponding to said actual field of view; means for selecting between a normal print setting and a pseudo format print setting; and means, responsive to said selecting means, for coding said film when said pseudo format print setting is selected to identify a portion less than all of said frame which, when said portion is printed during said subsequent processing, will provide a pseudo format print having a field of view different from said actual field of view; said camera being characterized in that:

said selecting means includes means for simultaneously selecting both said normal and pseudo format print settings; and said coding means includes means, responsive to said simultaneously selecting means, for coding said film when both of said print settings are selected with a composite code to identify both said portion less than all of said frame and all of said frame, to provide both said pseudo format print and said normal print from said frame during said subsequent processing.

6. A camera as in claim 5, wherein said selecting means comprises means for selecting among a normal print setting, a first pseudo format print setting and a second pseudo format print setting; said coding means comprises means, responsive to said selecting means, for coding said film when said first pseudo format print setting is selected to identify a first portion less than all of said frame which, when said first portion is printed during said subsequent processing, will provide a first pseudo format print having a first field of view different from said actual field of view; and said coding means further comprises means, responsive to said selecting means, for coding said film when said second pseudo format print setting is selected to identify a second portion less than all of said frame which, when said second portion is printed during said subsequent processing, will provide a second pseudo format print having a second field of view different from said actual field of view; and wherein said camera is further characterized in that:

said simultaneously selecting means comprises means for simultaneously selecting a plurality of said normal, first pseudo format and second pseudo format print settings; and said coding means comprises means, responsive to said simultaneously selecting means, for coding said film when said plurality of print settings is selected to identify a corresponding plurality of all, first or second portions of said frame to provide a plurality of different respectively corresponding normal, first pseudo format or second pseudo format prints from said frame during said subsequent processing.

7. A camera as in claim 6, wherein said first pseudo format is a pseudo telephoto format, and said second pseudo format is a pseudo panoramic format.

8. A method for producing prints of a subject in selected normal or pseudo print formats using a photographic camera having a shutter release mechanism; an objective lens with an actual field of view; means for selecting between a normal print setting designating a normal print having a field of view corresponding to said actual field of view and a pseudo format print setting designating a pseudo format print having a field of view different from said actual field of view; and means, responsive to said selecting means, for coding said film to identify said selected print setting; said method comprising the steps of:

a) selecting a print setting using said selecting means;
b) activating said shutter release mechanism for exposing a frame of a film through said lens;
c) coding said film with data to identify said selected print setting;
d) developing said exposed film;
e) sensing said data from said developed film to determine said selected print setting; and
f) actuating a printing system to print said frame onto a photosensitive medium in accordance with print parameters based on said data sensing; said printing system acting in response to said sensing to print all of said frame to provide said normal print when said normal print setting is selected, and to print a portion less than all of said frame to provide said pseudo format print when said pseudo format print setting is selected; and said method being characterized in that:

said selecting step includes simultaneously selecting both said normal and pseudo format print settings; and said exposing and coding steps are performed cooperatively in response to a single activation of said shutter release mechanism, so that said sensing and actuating steps will provide both said normal and pseudo format prints.

9. A method as in claim 8, wherein said exposing step comprises exposing first and second frames in rapid succession with a single activation of said shutter release mechanism; said coding step comprises coding said film to identify said portionless than all of said frame for said first frame and all of said frame for said second frame; and said actuating step comprises actuating said printing systems to print said pseudo format print from said first frame and said normal print from said second frame.

10. A method as in claim 9, wherein said camera selecting means comprises means for selecting among a normal print setting, a first pseudo format print setting and a second pseudo format print setting; said coding means comprises means, responsive to said selecting means, for coding said film when said first pseudo format print setting is selected to identify a first portion less than all of said frame which, when said first portion is printed during said subsequent processing, will provide a first pseudo format print having a first field of view different from said actual field of view; and said coding means further comprises means, responsive to said selecting means, for coding said film when said second pseudo format print setting is selected to identify a second portion less than all of said frame which, when said second portion is printed during said subsequent processing, will provide a second pseudo format print having a second field of view different from said actual field of view; and wherein said method is further characterized in that:

said simultaneously selecting step comprises simultaneously selecting all of said normal, first pseudo format and second pseudo format print settings;

said exposing step comprises exposing three frames in rapid succession with a single activation of said shutter release mechanism;

said coding step comprises coding said film to identify said first portion less than all of said frame for one of said three frames, said second portion less than all of said frame for another of said three frames, and all of said frame for a third of said three frames; and said actuating step comprises actuating said printing system to print said first pseudo format print from said one frame, said second pseudo format print from said another frame and said normal print from said third frame.

11. A method as in claim 10, wherein said first pseudo format is a pseudo telephoto format, and said second pseudo format is a pseudo panoramic format.

12. A method as in claim 10, wherein said camera further has means, responsive to said selecting means, for determining film exposure parameters for proper exposure of said frame; and wherein said method is further characterized in that:

said exposing step comprises exposing said first frame in accordance with exposure parameters selected by said exposure parameters determining means for proper exposure of said fist frame to provide said pseudo format print, and exposing said second frame in accordance with different exposure parameters selected by said exposure parameters determining means for proper exposure of said second frame to provide said normal print.

13. A method as in claim 8, wherein said coding step comprises coding said film with a composite code to identify said simultaneous selection of both said normal and pseudo format print settings; and said actuating step comprises actuating said printing system to print both said pseudo format print and said normal print from said frame in response to sensing said composite code.

14. A method as in claim 13, wherein said printing system includes means for advancing the developed film, and means for advancing said photosensitive medium; and wherein said method is further characterized in that said actuating step includes advancing said photosensitive medium without advancing said film.

15. A method as in claim 13, wherein said camera selecting means comprises means for selecting among a normal print setting, a first pseudo format print setting and a second pseudo format print setting; said coding means comprises means, responsive to said selecting means, for coding said film when said first pseudo format print setting is selected to identify a first portion less than all of said frame which, when said first portion is printed during said subsequent processing, will provide a first pseudo format print having a first field of view different from said actual field of view; and said coding means further comprises means, responsive to said selecting means, for coding said film when said second pseudo format print setting is selected to identify a second portion less than all of said frame which, when said second portion is printed during said subsequent processing, will provide a second pseudo format print having a second field of view different from said actual field of view; and wherein said method is further characterized in that:

said simultaneously selecting step comprises simultaneously selecting all of said normal, first pseudo format and second pseudo format print settings;

said coding step comprises coding said film with said composite code to identify corresponding all, first and second portions of said frame, and said actuating step comprises actuating said printing system to print all of said normal, first pseudo format and second pseudo format prints from said frame.

16. A method as in claim 15, wherein said printing system includes means for advancing the developed film, and means for advancing said photosensitive medium; and wherein said method is further characterized in that said actuating step includes advancing said photosensitive medium without advancing said film.

17. A method as in claim 15, wherein said first pseudo format is a pseudo telephoto format, and said second pseudo format is a pseudo panoramic format.

* * * * *

UNITED STATES PATENT AND TRADEMARK OFFICE
CERTIFICATE OF CORRECTION

PATENT NO. : 5,204,707

DATED : April 20, 1993

INVENTOR(S) : Donald M. Harvey

It is certified that error appears in the above-indentified patent and that said Letters Patent is hereby corrected as shown below:

| | |
|---|---|
| Col. 7, line 5 | "leans" should read --lens-- |
| Col. 7, line 33 | "rom" should read --from-- |
| Col. 8, line 16 | "fist" should read --first-- |
| Col. 9, line 59 | "portionless" should read --portion less-- |
| Col. 10, line 45 | "fist" should read --first-- |

Signed and Sealed this

Fifteenth Day of February, 1994

Attest:

BRUCE LEHMAN

*Attesting Officer*        Commissioner of Patents and Trademarks